United States Patent
Wang et al.

(10) Patent No.: US 12,019,834 B2
(45) Date of Patent: Jun. 25, 2024

(54) TOUCH CONTROL STRUCTURE AND DISPLAY APPARATUS

(71) Applicants: Chengdu BOE Optoelectronics Technology Co., Ltd., Sichuan (CN); BOE Technology Group Co., Ltd., Beijing (CN)

(72) Inventors: Lingran Wang, Beijing (CN); Ping Wen, Beijing (CN)

(73) Assignees: Chengdu BOE Optoelectronics Technology Co., Ltd., Sichuan (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/761,186

(22) PCT Filed: May 26, 2021

(86) PCT No.: PCT/CN2021/096086
§ 371 (c)(1),
(2) Date: Dec. 1, 2022

(87) PCT Pub. No.: WO2022/246692
PCT Pub. Date: Dec. 1, 2022

(65) Prior Publication Data
US 2024/0045554 A1 Feb. 8, 2024

(51) Int. Cl.
*G06F 3/044* (2006.01)
(52) U.S. Cl.
CPC .......... *G06F 3/0446* (2019.05); *G06F 3/0448* (2019.05)
(58) Field of Classification Search
CPC ............................ G06F 3/0446; G06F 3/0448
See application file for complete search history.

(56) References Cited

U.S. PATENT DOCUMENTS

2011/0069036 A1   3/2011   Anno
2013/0264095 A1  10/2013   Lai et al.
(Continued)

FOREIGN PATENT DOCUMENTS

CN   103294311 A   9/2013
CN   105308541 A   2/2016
(Continued)

OTHER PUBLICATIONS

International Search Report & Written Opinion mailed Feb. 25, 2022, regarding PCT/CN2021/096086.
(Continued)

*Primary Examiner* — Sahlu Okebato
(74) *Attorney, Agent, or Firm* — Intellectual Valley Law, P.C.

(57) ABSTRACT

A touch control structure is provided. The touch control structure includes a plurality of first mesh electrodes respectively in a plurality of rows and a plurality of second mesh electrodes respectively in a plurality of columns. A respective one of the plurality of first mesh electrodes includes a plurality of first mesh blocks consecutively connected in a respective row. The plurality of first mesh blocks includes a first respective first mesh block in a space formed by a first set of four adjacent second mesh blocks. The first respective first mesh block is spaced apart and insulated from the four adjacent second mesh blocks in the first set. The four adjacent second mesh blocks in the first set is electrically connected to each other.

17 Claims, 16 Drawing Sheets

(56) References Cited

U.S. PATENT DOCUMENTS

| | | | |
|---|---|---|---|
| 2014/0118298 A1* | 5/2014 | Han | G06F 3/0443 |
| | | | 345/174 |
| 2014/0184939 A1* | 7/2014 | Lai | G06F 3/0443 |
| | | | 349/12 |
| 2014/0253499 A1 | 9/2014 | Lee et al. | |
| 2014/0320757 A1 | 10/2014 | Hoshtanar | |
| 2018/0059843 A1 | 3/2018 | Kim | |
| 2018/0120615 A1 | 5/2018 | Wang et al. | |
| 2018/0181226 A1 | 6/2018 | Zheng et al. | |
| 2018/0335918 A1 | 11/2018 | Wang et al. | |
| 2019/0204952 A1* | 7/2019 | Han | H10K 50/844 |
| 2020/0333918 A1* | 10/2020 | Lin | G06F 3/0446 |
| 2021/0333942 A1* | 10/2021 | Zhang | G06F 3/0446 |

FOREIGN PATENT DOCUMENTS

| | | |
|---|---|---|
| CN | 205334425 U | 6/2016 |
| CN | 106055147 A | 10/2016 |
| CN | 106201084 A | 12/2016 |
| CN | 106445267 A | 2/2017 |
| CN | 109947294 A | 6/2019 |
| CN | 212848408 U | 3/2021 |
| CN | 213071139 U | 4/2021 |
| EP | 3291072 A1 | 3/2018 |
| KR | 20140065601 A | 5/2014 |

OTHER PUBLICATIONS

The Extended European Search Report in the European Patent Application No. 21942273.0, dated Sep. 11, 2023.

* cited by examiner

TOUCH CONTROL STRUCTURE AND DISPLAY APPARATUS

CROSS-REFERENCE TO RELATED APPLICATION

This application is a national stage application under 35 U.S.C. § 371 of International Application No. PCT/CN2021/096086, filed May 26, 2021, the contents of which are incorporated by reference in the entirety.

TECHNICAL FIELD

The present invention relates to display technology, more particularly, to a touch control structure and a display apparatus.

BACKGROUND

Various types of touch panels have been developed. Examples of touch panels include one-glass-solution (OGS) touch panels, on-cell touch panels, and in-cell touch panels. The on-cell touch panels provide high touch control accuracy. The on-cell touch panels can be classified into single-layer-on-cell (SLOC) touch panels and multi-layer-on-cell (MLOC) touch panels. In particular, multiple point touch control can be achieved in the MLOC touch panels with superior touch control accuracy and blanking effects.

SUMMARY

In one aspect, the present disclosure provides a touch control structure, comprising a plurality of first mesh electrodes respectively in a plurality of rows and a plurality of second mesh electrodes respectively in a plurality of columns; wherein a respective one of the plurality of first mesh electrodes comprises a plurality of first mesh blocks consecutively connected in a respective row; and the plurality of first mesh blocks comprise a first respective first mesh block in a space formed by a first set of four adjacent second mesh blocks, the first respective first mesh block spaced apart and insulated from the four adjacent second mesh blocks in the first set, the four adjacent second mesh blocks in the first set being electrically connected to each other.

In some embodiments, the four adjacent second mesh blocks in the first set comprise a first respective second mesh block, a second respective second mesh block, a third respective second mesh block, and a fourth respective second mesh block; the first respective second mesh block and the third respective second mesh block are in a first row and are connected to each other along a row direction; the second respective second mesh block and the fourth respective second mesh block are in a second row and are connected to each other along the row direction; the third respective second mesh block and the fourth respective second mesh block are in a first column and are electrically connected to each other through a first respective conductive bridge; and the first respective second mesh block and the second respective second mesh block are in a second column and are electrically connected to each other through a second respective conductive bridge.

In some embodiments, the plurality of first mesh blocks further comprise a second respective first mesh block in a space formed by a second set of four adjacent second mesh blocks, the second respective first mesh block spaced apart and insulated from the four adjacent second mesh blocks in the second set; the first set and the second set have two second mesh blocks in common; the first respective first mesh block and the second respective first mesh block are connected to each other and directly adjacent to each other along the respective row; second mesh blocks in a same row in the second set are insulated from each other; and second mesh blocks in a same column in the second set are electrically connected to each other through a conductive bridge.

In some embodiments, the four adjacent second mesh blocks in the first set comprise a first respective second mesh block, a second respective second mesh block, a third respective second mesh block, and a fourth respective second mesh block; the four adjacent second mesh blocks in the second set comprise the first respective second mesh block, the second respective second mesh block, a fifth respective second mesh block, and a sixth respective second mesh block; the third respective second mesh block, the first respective second mesh block, and the fifth respective second mesh block are consecutively in a first row, the first respective second mesh block and the third respective second mesh block are connected to each other along the row direction, the first respective second mesh block and the fifth respective second mesh block are spaced apart and insulated from each other; the fourth respective second mesh block, the second respective second mesh block, and the sixth respective second mesh block are consecutively in a second row, the second respective second mesh block and the fourth respective second mesh block are connected to each other along the row direction, the second respective second mesh block and the sixth respective second mesh block are spaced apart and insulated from each other; the third respective second mesh block and the fourth respective second mesh block are in a first column and are electrically connected to each other through a first respective conductive bridge; and the first respective second mesh block and the second respective second mesh block are in a second column and are electrically connected to each other through a second respective conductive bridge; the fifth respective second mesh block and the sixth respective second mesh block are in a third column and are electrically connected to each other through a third respective conductive bridge; and the first column, the second column, and the third column are consecutively arranged.

In some embodiments, a respective one of the plurality of second mesh electrodes comprises a plurality of second mesh blocks consecutively electrically connected in a respective column; the plurality of columns comprise a first column, a second column, and a third column; the first column, the second column, and the third column are sequentially three consecutive columns; a second mesh block in the first column, a second mesh block in the second column, and a second mesh block in the third column are along a row direction; and the second mesh block in the second column is connected to the second mesh block in first column, and is spaced apart and insulated from the second mesh block in the third column.

In some embodiments, the plurality of columns further comprise a fourth column and a fifth column; the fifth column, the first column, the second column, the third column, and the fourth column are sequentially five consecutive columns; the second mesh block in the third column is connected to a second mesh block in the fourth column; the second mesh block in the first column is spaced apart and insulated from a second mesh block in the fifth column; and the second mesh block in the fifth column, the second mesh block in the first column, the second mesh block in the second column, the second mesh block in the third column, and the second mesh block in the fourth column are along the row direction.

In some embodiments, the plurality of second mesh electrodes comprise a plurality of groups; a respective group of the plurality of groups comprises two second mesh electrodes respectively in two adjacent columns; second mesh blocks respectively in the two adjacent columns and in a same row are connected to each other; and adjacent second mesh blocks respectively in different groups and in a same row are spaced apart and insulated from each other.

In some embodiments, in a space between the two adjacent columns of the two second mesh electrodes in a same group of the plurality of groups, first mesh blocks respectively from the plurality of rows of first mesh electrodes form an intra-group column of first mesh blocks, first mesh blocks in the intra-group column are insulated from each other.

In some embodiments, in a space between two adjacent groups of the plurality of groups, first mesh blocks respectively from the plurality of rows of first mesh electrodes form an inter-group column of first mesh blocks, first mesh blocks in the inter-group column are insulated from each other.

In some embodiments, a respective one of the plurality of second mesh electrodes comprises a plurality of second mesh blocks and a plurality of conductive bridges in a respective column, the plurality of second mesh blocks being consecutively electrically connected respectively through the plurality of conductive bridges; the touch control structure further comprises a touch insulating layer; the plurality of first mesh blocks and the plurality of second mesh blocks are on a side of the touch insulating layer away from the plurality of conductive bridges; and a respective conductive bridge of the plurality of conductive bridges are respectively electrically connected to two adjacent second mesh blocks respectively through vias extending through the touch insulating layer.

In some embodiments, the respective conductive bridge comprises a first truncated hexagonal mesh, a hexagonal mesh, and a second truncated hexagonal mesh consecutively connected to each other; the first truncated hexagonal mesh is electrically connected to a first adjacent second mesh block, two mesh lines of the first truncated hexagonal mesh are respectively connected to one or more mesh lines of the first adjacent second mesh block respectively through a first via and a second via; and the second truncated hexagonal mesh is electrically connected to a second adjacent second mesh block, two mesh lines of the second truncated hexagonal mesh are respectively connected to one or more mesh lines of the second adjacent second mesh block respectively through a third via and a fourth via.

In some embodiments, an orthographic projection on a base substrate of any mesh line of the respective conductive bridge along a direction from the first adjacent second mesh block to the second adjacent second mesh block is at least partially non-overlapping with orthographic projections of mesh lines of the plurality of first mesh electrodes on the base substrate; and an orthographic projection on the base substrate of any mesh line of the respective conductive bridge along a direction other than the direction from the first adjacent second mesh block to the second adjacent second mesh block overlaps with an orthographic projection of a connecting mesh line of the plurality of first mesh electrodes on the base substrate.

In some embodiments, the connecting mesh line comprises a mesh line connecting two adjacent first mesh blocks of the plurality of first mesh blocks in the respective row.

In some embodiments, the two adjacent first mesh blocks of the plurality of first mesh blocks in the respective row are connected through a connecting structure consisting of one or more mesh arranged in a single row.

In some embodiments, a respective first mesh block of the plurality of first mesh electrodes has a pseudo-square shape with protrusions protruding away from a main body and recesses recessing into the main body; each side of the respective first mesh block of the plurality of first mesh electrodes has a length in a range of 1.5 mm to 2.5 mm; the respective second mesh blocks of the plurality of second mesh electrodes has a pseudo-square shape with protrusions protruding away from a main body and recesses recessing into the main body; and each side of the respective second mesh blocks of the plurality of second mesh electrodes has a length in a range of 1.5 mm to 2.5 mm.

In another aspect, the present disclosure provides display apparatus, comprising a display panel, a touch control structure on the display panel, and a plurality of touch control integrated circuits connect to the touch control structure; wherein the touch control structure comprises a plurality of first mesh electrodes respectively in a plurality of rows and a plurality of second mesh electrodes respectively in a plurality of columns; wherein a respective one of the plurality of first mesh electrodes comprises a plurality of first mesh blocks consecutively connected in a respective row; and the plurality of first mesh blocks comprise a first respective first mesh block in a space formed by a first set of four adjacent second mesh blocks, the first respective first mesh block spaced apart and insulated from the four adjacent second mesh blocks in the first set, the four adjacent second mesh blocks in the first set being electrically connected to each other.

In some embodiments, the display apparatus further comprises: an anode layer comprising a plurality of anodes respectively in a plurality of subpixels; a light emitting layer on the anode layer; a cathode layer a side of the light emitting layer away from the anode layer; an encapsulating layer on a side of the cathode layer away from the light emitting layer, the encapsulating layer encapsulating a plurality of display elements in a display region of the display panel; and a touch insulating layer on a side of the encapsulating layer away from the cathode layer; wherein a respective one of the plurality of second mesh electrodes comprises a plurality of second mesh blocks and a plurality of conductive bridges in a respective column, the plurality of second mesh blocks being consecutively electrically connected respectively through the plurality of conductive bridges; the plurality of first mesh blocks and the plurality of second mesh blocks are on a side of the touch insulating layer away from the plurality of conductive bridges; and a respective conductive bridge of the plurality of conductive bridges are respectively electrically connected to two adjacent second mesh blocks respectively through vias extending through the touch insulating layer.

In some embodiments, orthographic projections of mesh lines of the touch control structure in the display region on a base substrate are non-overlapping with orthographic projections of the plurality of anodes on the base substrate; and an orthographic projection of a mesh of the touch control structure in the display region on the base substrate surrounds an orthographic projection of one or two anode on the base substrate.

In some embodiments, the respective conductive bridge comprises a first truncated hexagonal mesh, a hexagonal mesh, and a second truncated hexagonal mesh consecutively connected to each other; the first truncated hexagonal mesh is electrically connected to a first adjacent second mesh block, two mesh lines of the first truncated hexagonal mesh are respectively connected to one or more mesh lines of the first adjacent second mesh block respectively through a first via and a second via; and the second truncated hexagonal mesh is electrically connected to a second adjacent second mesh block, two mesh lines of the second truncated hexagonal mesh are respectively connected to one or more mesh lines of the second adjacent second mesh block respectively through a third via and a fourth via.

In some embodiments, an orthographic projection of the hexagonal mesh on a base substrate surrounds an orthographic projection of an anode on the base substrate; an orthographic projection of the first truncated hexagonal mesh on the base substrate partially surrounds an orthographic projection of an anode on the base substrate; and an orthographic projection of the second truncated hexagonal mesh on the base substrate partially surrounds an orthographic projection of an anode on the base substrate.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

The present disclosure provides, inter alia, a touch control structure and a display apparatus that substantially obviate one or more of the problems due to limitations and disadvantages of the related art. In one aspect, the present disclosure provides a touch control structure. In some embodiments, the touch control structure includes a plurality of first mesh electrodes respectively in a plurality of rows and a plurality of second mesh electrodes respectively in a plurality of columns. Optionally, a respective one of the plurality of first mesh electrodes comprises a plurality of first mesh blocks consecutively connected in a respective row. Optionally, the plurality of first mesh blocks include a first respective first mesh block in a space formed by a first set of four adjacent second mesh blocks, the first respective first mesh block spaced apart and insulated from the four adjacent second mesh blocks in the first set, the four adjacent second mesh blocks in the first set being electrically connected to each other.

Flexible multi-layer on-cell touch (FMLOC) technology is utilized to form mesh electrode pattern on top of an encapsulating layer of a display panel. The mesh electrode pattern includes touch scanning electrodes and touch sensing electrodes, and optionally fill patterns ("dummy patterns"). A touch detection integrated circuit is configured to detect a touch by sensing a mutual capacitance between a touch scanning electrode and a touch sensing electrode, and a change of the mutual capacitance upon a touch. Mesh electrodes includes mesh lines typically have a line width in a range of 1 μm to 50 μm. Thus, connecting adjacent mesh blocks through the mesh lines is particularly difficult, and often resulting in poor connectivity. The present disclosure adopts a novel and advantageous touch electrode design that obviate issues in related touch control structures.

Figure 1:
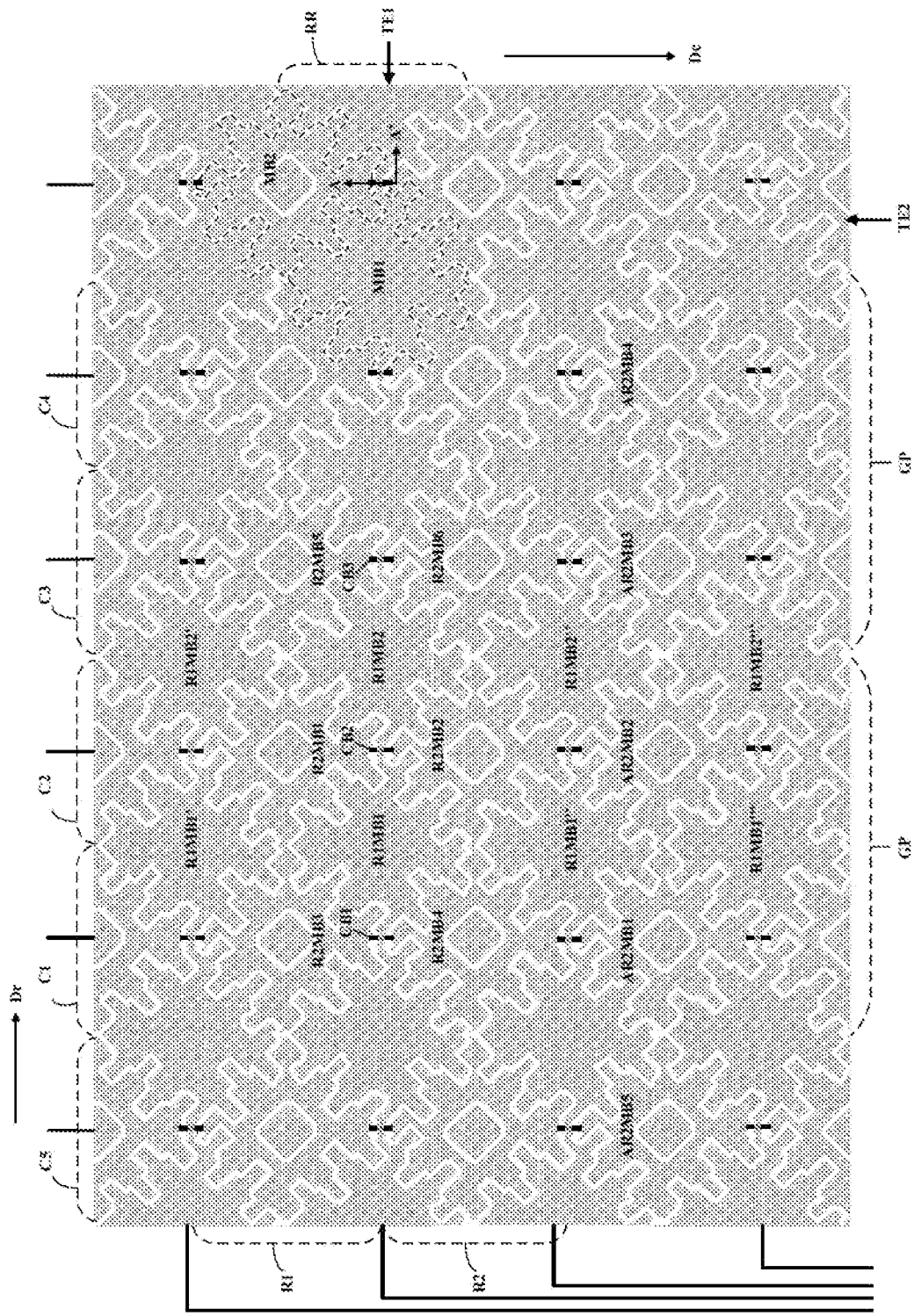
FIG. 1 is a schematic diagram illustrating the structure of a touch control structure in some embodiments according to the present disclosure.

FIG. 1 is a schematic diagram illustrating the structure of a touch control structure in some embodiments according to the present disclosure. Referring to FIG. 1, the touch control structure in some embodiments includes a plurality of first mesh electrodes TE1 arranged in a plurality of rows and a plurality of second mesh electrodes TE2 arranged in a plurality of columns. The plurality of first mesh electrodes TE1 are arranged in a plurality of rows, each of the plurality of rows is a respective one of the plurality of first mesh electrodes TE1. The plurality of second mesh electrodes TE2 arranged in a plurality of columns, each of the plurality of columns is a respective one of the plurality of second mesh electrodes TE2. Optionally, the touch control structure is a mutual capacitance type touch control structure. Optionally, the plurality of first mesh electrodes TE1 are a plurality of touch sensing electrodes, and the plurality of second mesh electrodes TE2 are a plurality of touch scanning electrodes. Optionally, the plurality of first mesh electrodes TE1 are a plurality of touch scanning electrodes, and the plurality of second mesh electrodes TE2 are a plurality of touch sensing electrodes.

As shown in FIG. 1, a respective one of the plurality of first mesh electrodes TE1 includes a plurality of first mesh blocks MB1 consecutively connected in a respective row RR, a respective one of the plurality of second mesh electrodes TE2 includes a plurality of second mesh blocks MB2 consecutively connected in a respective column. In FIG. 1, a respective one of the plurality of first mesh blocks MB1 and a respective one of the plurality of second mesh blocks MB2 are depicted as blocks respectively encircled by dotted lines.

In some embodiments, the plurality of first mesh blocks MB1 include a first respective first mesh block R1MB1 in a remaining space formed by a first set of four adjacent second mesh blocks (e.g., R2MB1, R2MB2, R2MB3, and R2MB4 as depicted in FIG. 1). The first respective first mesh block R1MB1 is spaced apart and insulated from the four adjacent second mesh blocks in the first set. The four adjacent second mesh blocks in the first set are electrically connected to each other.

In some embodiments, the four adjacent second mesh blocks in the first set include a first respective second mesh block R2MB1, a second respective second mesh block R2MB2, a third respective second mesh block R2MB3, and a fourth respective second mesh block R2MB4. The first respective second mesh block R2MB1 and the third respective second mesh block R2MB3 are in a first row R1 and are connected to each other along a row direction Dr. The second respective second mesh block R2MB2 and the fourth respective second mesh block R2MB4 are in a second row R2 and are connected to each other along the row direction Dr. The third respective second mesh block R2MB3 and the fourth respective second mesh block R2MB4 are in a first column C1 and are electrically connected to each other through a first respective conductive bridge CB1. The first respective second mesh block R2MB1 and the second respective second mesh block R2MB2 are in a second column C2 and are electrically connected to each other through a second respective conductive bridge CB2.

In some embodiments, the plurality of first mesh blocks MB1 further include a second respective first mesh block R1MB2 in a remaining space formed by a second set of four adjacent second mesh blocks (e.g., R2MB1, R2MB2, R2MB5, and R2MB6 as depicted in FIG. 1). The second respective first mesh block R1MB2 is spaced apart and insulated from the four adjacent second mesh blocks in the second set. The first respective first mesh block and the second respective first mesh block are connected to each other and directly adjacent to each other along the respective row RR of the plurality of rows of first mesh electrodes. The first set and the second set have two second mesh blocks (for example, R2MB1 and R2MB2 in C1) in common. In one example as shown in FIG. 1, the first set and the second set have two second mesh blocks in a same column in common. Second mesh blocks in a same row (for example, R2MB1 and R2MB5 in R1, or R2MB2 and R2MB6 in R2) in the second set are insulated from each other. Second mesh blocks in a same column (e.g., R2MB1 and R2MB2 in C1, or R2MB5 and R2MB6 in C5) in the second set are electrically connected to each other through a conductive bridge.

In some embodiments, the four adjacent second mesh blocks in the first set include a first respective second mesh block R2MB1, a second respective second mesh block R2MB2, a third respective second mesh block R2MB3, and a fourth respective second mesh block R2MB4; and the four adjacent second mesh blocks in the second set comprise the first respective second mesh block R2MB1, the second respective second mesh block R2MB2, a fifth respective second mesh block R2MB5, and a sixth respective second mesh block R2MB6. The third respective second mesh block R2MB3, the first respective second mesh block R2MB1, and the fifth respective second mesh block R2MB5 are consecutively in a first row R1. The first respective second mesh block R2MB1 and the third respective second mesh block R2MB3 are connected to each other along the row direction Dr. The first respective second mesh block R2MB1 and the fifth respective second mesh block R2MB5 are spaced apart and insulated from each other. The fourth respective second mesh block R2MB4, the second respective second mesh block R2MB2, and the sixth respective second mesh block R2MB6 are consecutively in a second row R2. The second respective second mesh block R2MB2 and the fourth respective second mesh block R2MB4 are connected to each other along the row direction Dr. The second respective second mesh block R2MB2 and the sixth respective second mesh block R2MB6 are spaced apart and insulated from each other. The third respective second mesh block R2MB3 and the fourth respective second mesh block R2MB4 are in a first column C1 and are electrically connected to each other through a first respective conductive bridge CB1. The first respective second mesh block R2MB1 and the second respective second mesh block R2MB2 are in a second column C2 and are electrically connected to each other through a second respective conductive bridge CB2. The fifth respective second mesh block R2MB5 and the sixth respective second mesh block R2MB6 are in a third column C3 and are electrically connected to each other through a third respective conductive bridge CB3. The first column C1, the second column C2, and the third column C3 are consecutively arranged.

In some embodiments, a respective one of the plurality of second mesh electrodes TE2 includes a plurality of second mesh blocks MB2 consecutively electrically connected in a respective column. Referring to FIG. 1 again, the plurality of columns in some embodiments include a first column C1, a second column C2, and a third column C3. The first column C1, the second column C2, and the third column C3 are sequentially three consecutive columns. A second mesh block AR2MB1 in the first column C1, a second mesh block AR2MB2 in the second column C2, and a second mesh block AR2MB3 in the third column C3 are along a row direction Dr. The second mesh block AR2MB2 in the second column C2 is connected to the second mesh block AR2MB1 in first column C1, and is spaced apart and insulated from the second mesh block AR2MB3 in the third column C3.

In some embodiments, the plurality of columns further include a fourth column C4 and a fifth column C5. The fifth column C5, the first column C1, the second column C2, the third column C3, and the fourth column C4 are sequentially five consecutive columns. The second mesh block AR2MB3 in the third column C3 is connected to a second mesh block AR2MB4 in the fourth column C4. The second mesh block AR2MB1 in the first column C1 is spaced apart and insulated from a second mesh block AR2MB5 in the fifth column C5. The second mesh block AR2MB5 in the fifth column C5, the second mesh block AR2MB1 in the first column C1, the second mesh block AR2MB2 in the second column C2, the second mesh block AR2MB3 in the third column C3, and the second mesh block AR2MB4 in the fourth column C4 are along the row direction Dr.

In some embodiments, referring to FIG. 1 again, the plurality of second mesh electrodes TE2 include a plurality of groups GP. A respective group of the plurality of groups GP includes two second mesh electrodes of the plurality of second mesh electrodes TE2 respectively in two adjacent columns. For example, a first group of the plurality of groups GP includes two second mesh electrodes of the plurality of second mesh electrodes TE2 respectively in the first column C1 and the second column C2; a second group of the plurality of groups GP includes two second mesh electrodes of the plurality of second mesh electrodes TE2 respectively in the third column C3 and the fourth column C4. Second mesh blocks respectively in the two adjacent columns and in a same row are connected to each other. For example, second mesh blocks AR2MB1 and AR2MB2 respectively in the two adjacent columns (C1 and C2) and in a same row are connected to each other; and second mesh blocks AR2MB3 and AR2MB4 respectively in the two adjacent columns (C3 and C4) and in a same row are connected to each other. Adjacent second mesh blocks respectively in different groups and in a same row are spaced apart and insulated from each other. For example, adjacent second mesh blocks AR2MB2 and AR2MB3 respectively in different groups and in a same row are spaced apart and insulated from each other.

In some embodiments, in a remaining space between the two adjacent columns of the two second mesh electrodes in a same group of the plurality of groups, first mesh blocks respectively from the plurality of rows of first mesh electrodes form an intra-group column of first mesh blocks, first mesh blocks in the intra-group column are insulated from each other. As shown in FIG. 1, in the remaining space between the two adjacent columns C1 and C2 in a same group of the plurality of groups, first mesh blocks respectively from the plurality of rows of first mesh electrodes (including R1MB1', R1MB1, R1MB1", and R1MB1'") form an intra-group column of first mesh blocks, first mesh blocks in the intra-group column are insulated from each other.

In some embodiments, in a remaining space between two adjacent groups of the plurality of groups, first mesh blocks respectively from the plurality of rows of first mesh electrodes form an inter-group column of first mesh blocks, first mesh blocks in the inter-group column are insulated from each other. As shown in FIG. 1, in the remaining space between two adjacent groups of the plurality of groups GP (e.g., between column C2 and column C3), first mesh blocks respectively from the plurality of rows of first mesh electrodes (including R1MB2', R1MB2, R1MB2", and R1MB2'") form an inter-group column of first mesh blocks, first mesh blocks in the inter-group column are insulated from each other.

Figure 2:
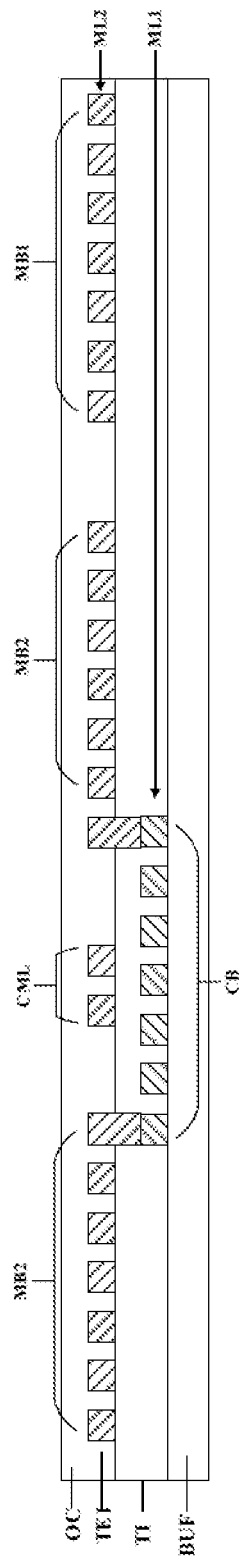
FIG. 2 is a cross-sectional view along an A-A' line in FIG. 1.

FIG. 2 is a cross-sectional view along an A-A' line in FIG. 1. Referring to FIG. 1 and FIG. 2, a respective one of the plurality of second mesh electrodes TE2 includes a plurality of second mesh blocks MB2 and a plurality of conductive bridges CB in a respective column. The plurality of second mesh blocks MB2 are consecutively electrically connected respectively through the plurality of conductive bridges CB.

In some embodiments, the touch control structure includes a buffer layer BUF, the plurality of conductive bridges CB on the buffer layer BUF, a touch insulating layer TI on a side of the plurality of conductive bridges CB away from the buffer layer BUF, the plurality of first mesh blocks MB1 and the plurality of second mesh blocks MB2 on a side of the touch insulating layer TI away from the plurality of conductive bridges CB, and an overcoat layer OC on a side of the plurality of first mesh blocks MB1 and the plurality of second mesh blocks MB2 away from the touch insulating layer TI. A respective conductive bridge of the plurality of conductive bridges CB are respectively electrically connected to two adjacent second mesh blocks respectively through vias extending through the touch insulating layer TI. A connecting mesh line CML connects adjacent first mesh blocks of the plurality of first mesh blocks MB1.

As shown in FIG. 2, the plurality of conductive bridges CB is in a first metal layer ML1 of the touch control structure. The plurality of first mesh blocks MB1, the plurality of second mesh blocks MB2, and the connecting mesh line CML are in a second metal layer ML2 of the touch control structure.

Figure 3A:
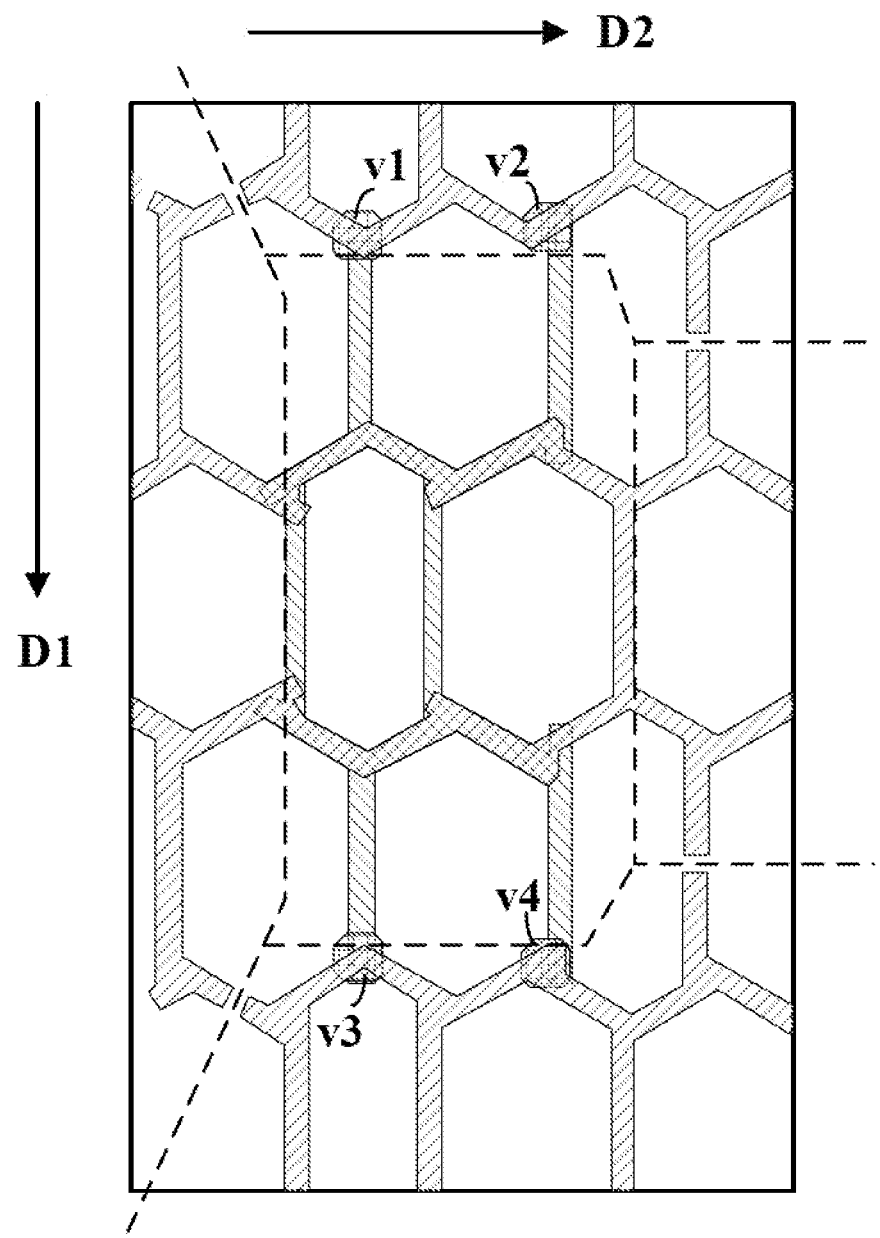
FIG. 3A is a zoom-in view of a region surrounding a respective conductive bridge in some embodiments according to the present disclosure.
Figure 3B:
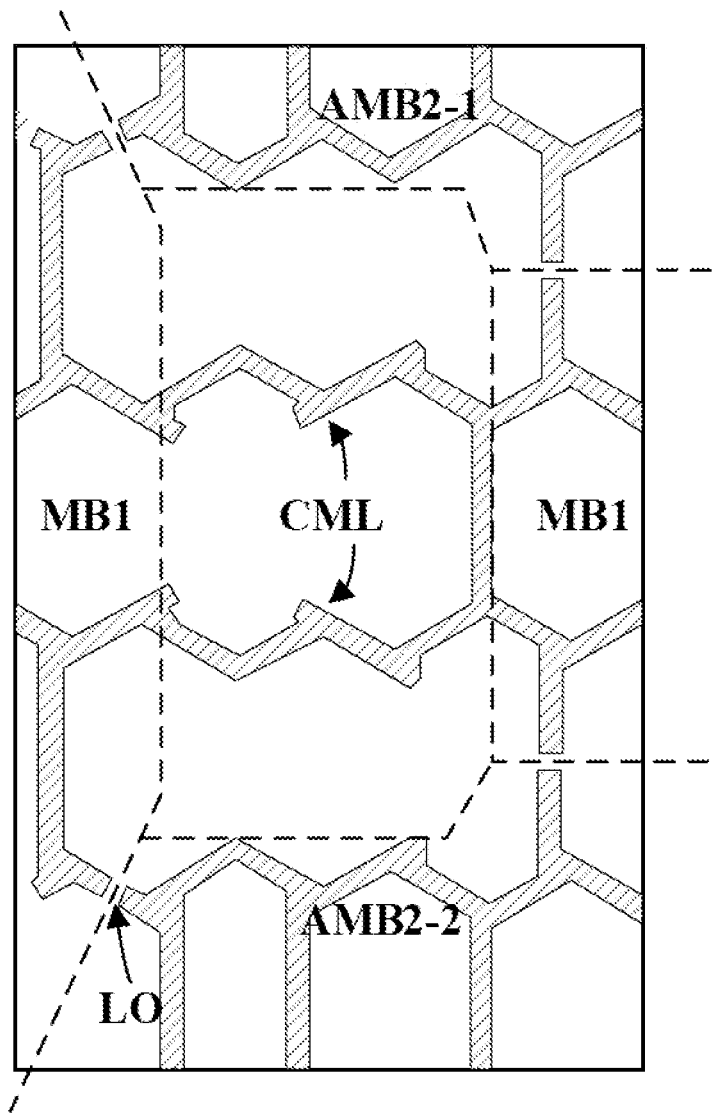
FIG. 3B illustrates the structure of a second metal layer in a region surrounding a respective conductive bridge in some embodiments according to the present disclosure.
Figure 3C:
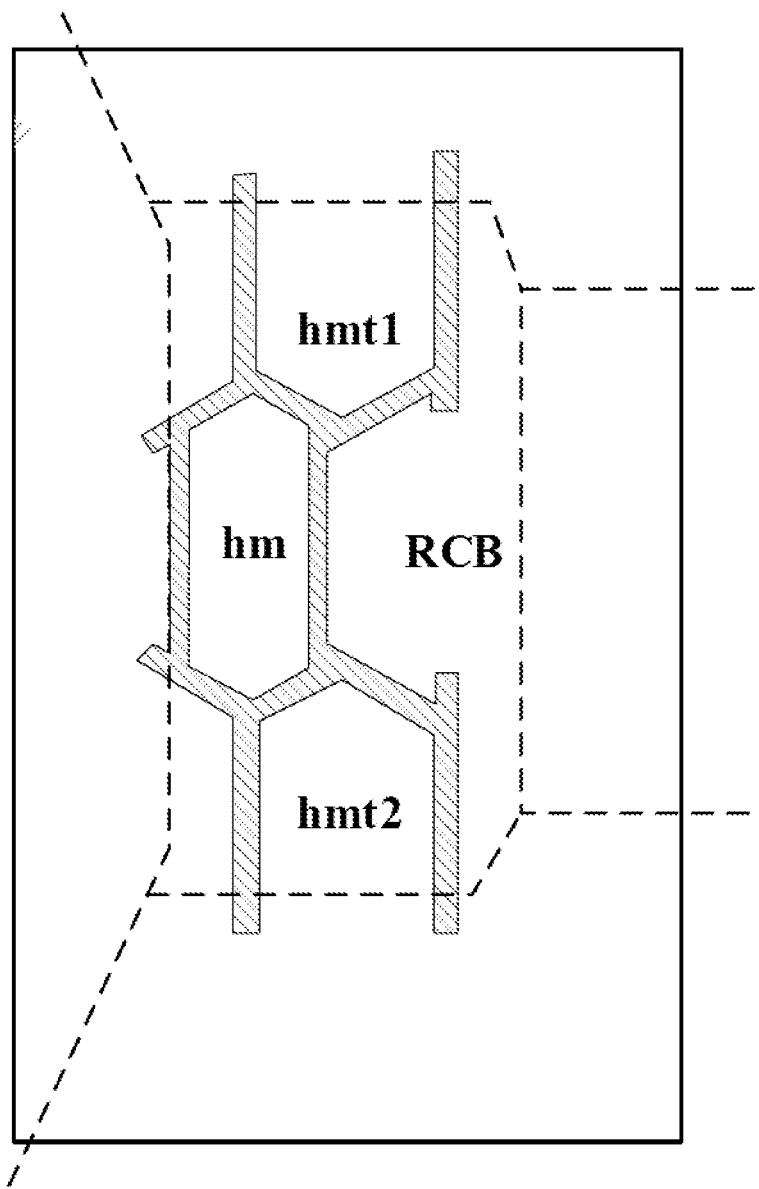
FIG. 3C illustrates the structure of a first metal layer in a region surrounding a respective conductive bridge in some embodiments according to the present disclosure.

FIG. 3A is a zoom-in view of a region surrounding a respective conductive bridge in some embodiments according to the present disclosure. FIG. 3B illustrates the structure of a second metal layer in a region surrounding a respective conductive bridge in some embodiments according to the present disclosure. FIG. 3C illustrates the structure of a first metal layer in a region surrounding a respective conductive bridge in some embodiments according to the present disclosure. Referring to FIG. 3A to FIG. 3C, the respective conductive bridge RCB in some embodiments includes a first truncated hexagonal mesh hmt1, a hexagonal mesh hm, and a second truncated hexagonal mesh hmt2 consecutively connected to each other. The respective conductive bridge RCB is in the first metal layer (ML1 as depicted in FIG. 2). The first truncated hexagonal mesh hmt1 is electrically connected to a first adjacent second mesh block AMB2-1, two mesh lines of the first truncated hexagonal mesh hmt1 are respectively connected to one or more mesh lines of the first adjacent second mesh block AMB2-1 respectively through a first via v1 and a second via v2. The second truncated hexagonal mesh hmt2 is electrically connected to a second adjacent second mesh block AMB2-2, two mesh lines of the second truncated hexagonal mesh hmt2 are respectively connected to one or more mesh lines of the second adjacent second mesh block AMB2-2 respectively through a third via v3 and a fourth via v4.

In some embodiments, an orthographic projection on a base substrate (e.g., the buffer layer BUF as depicted in FIG. 2) of any mesh line of the respective conductive bridge RCB along a direction (e.g., direction D1 as depicted in FIG. 3A) from the first adjacent second mesh block AMB2-1 to the second adjacent second mesh block AMB2-2 is at least partially non-overlapping with orthographic projections of mesh lines of the plurality of first mesh electrodes TE1 (e.g., the plurality of first mesh blocks MB1) on the base substrate. Optionally, the direction from the first adjacent second mesh block AMB2-1 to the second adjacent second mesh block AMB2-2 is substantially parallel to the column direction (Dc as depicted in FIG. 1), which is the extension direction of a respective one of the plurality of second mesh electrodes TE2. Optionally, the orthographic projection on the base substrate of any mesh line of the respective conductive bridge RCB along the direction from the first adjacent second mesh block AMB2-1 to the second adjacent second mesh block AMB2-2 is substantially non-overlapping with the orthographic projections of mesh lines of the plurality of first mesh electrodes TE1 on the base substrate.

In some embodiments, an orthographic projection on the base substrate of any mesh line of the respective conductive bridge RCB along a direction (e.g., direction D2 as depicted in FIG. 3A) other than the direction from the first adjacent second mesh block AMB2-1 to the second adjacent second mesh block AMB2-2 overlaps with an orthographic projection of a connecting mesh line CML of the plurality of first mesh electrodes TE1 on the base substrate. Optionally, the direction other than the direction from the first adjacent second mesh block AMB2-1 to the second adjacent second mesh block AMB2-2 is substantially parallel to the row direction (Dr as depicted in FIG. 1), which is the extension direction of a respective one of the plurality of first mesh electrodes TE1. Optionally, the connecting mesh line CML includes a mesh line connecting two adjacent first mesh blocks of the plurality of first mesh blocks MB1 in the respective row. The two adjacent first mesh blocks of the plurality of first mesh blocks MB1 in the respective row are connected through a connecting structure consisting of one or more mesh arranged in a single row (see, e.g., the connecting mesh line CML in FIG. 3B).

Optionally, the total overlapping area between the orthographic projection of the respective conductive bridge RCB on the base substrate and the orthographic projection of the plurality of first mesh electrodes TE1 on the base substrate is limited to an area of six mesh lines forming sides of the first truncated hexagonal mesh hmt1, the hexagonal mesh hm, or the second truncated hexagonal mesh hmt2.

Optionally, an average line width of the mesh lines (e.g., mesh lines of the plurality of first mesh blocks, mesh lines of the plurality of second mesh blocks, mesh lines of the conductive bridge, mesh lines of the connecting mesh line) is in a range of 1 μm to 10 μm, e.g., 1 μm to 2 μm, 2 μm to 3 μm, 3 μm to 4 μm, 4 μm to 5 μm, 5 μm to 6 μm, 6 μm to 7 μm, 7 μm to 8 μm, 8 μm to 9 μm, or 9 μm to 10 μm. Optionally, the average line width of the mesh lines is 4 μm.

In some embodiments, adjacent mesh blocks are spaced apart and insulated from each other by one or more line opens LO. For example, referring to FIG. 3B, the first adjacent second mesh block AMB2-1 is spaced apart and insulated from the adjacent first mesh blocks of the plurality of first mesh blocks MB1 by the one or more line opens LO. The second adjacent second mesh block AMB2-2 is spaced apart and insulated from the adjacent first mesh blocks of the plurality of first mesh blocks MB1 by the one or more line opens LO.

Optionally, an average width of the plurality of line opens LO is in a range of 2 μm to 12 μm, e.g., 2 μm to 3 μm, 3 μm to 4 μm, 4 μm to 5 μm, 5 μm to 6 μm, 6 μm to 7 μm, 7 μm to 8 μm, 8 μm to 9 μm, 9 μm to 10 μm, 10 μm to 11 μm, or 11 μm to 12 μm. Optionally, the average width of the plurality of line opens LO is 5.2 μm.

Figure 4A:
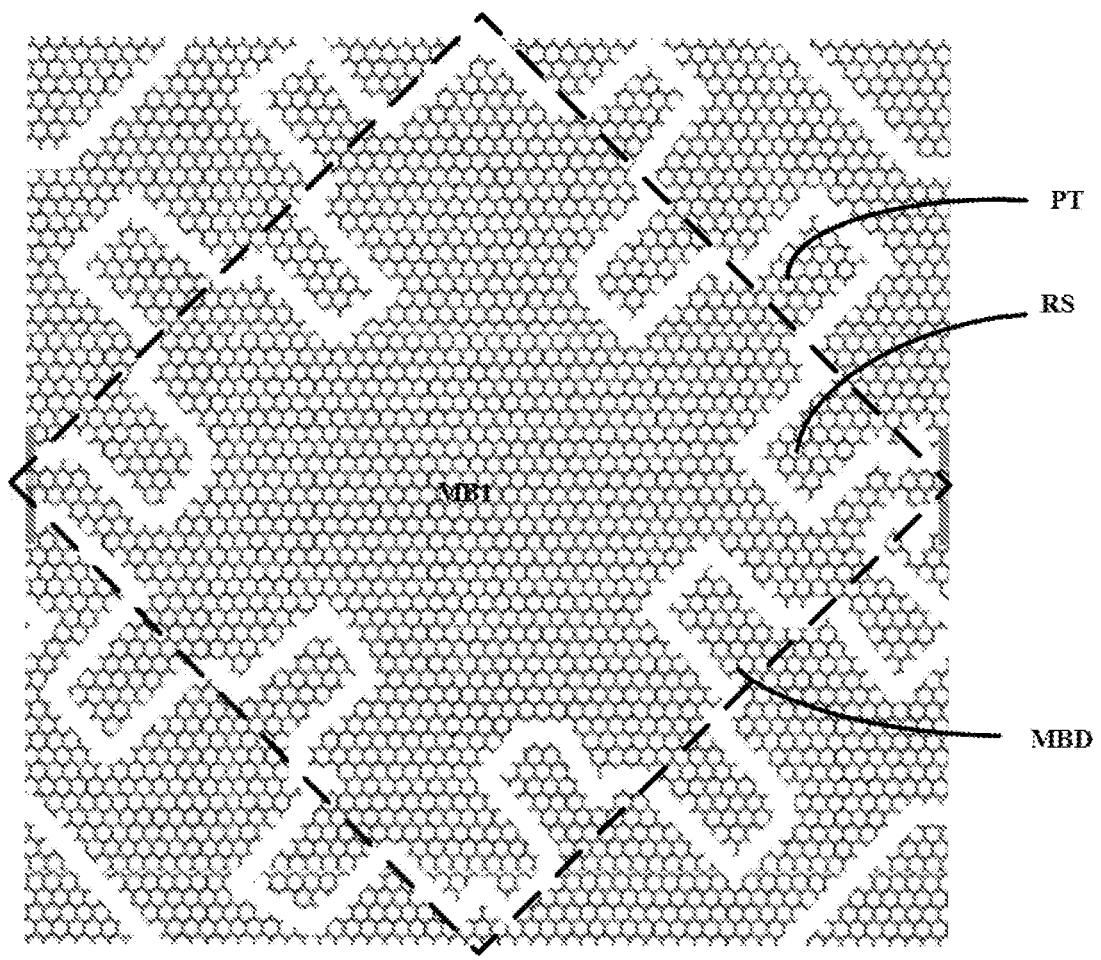
FIG. 4A is a zoom-in view of a respective one of a plurality of first mesh block in some embodiments according to the present disclosure.
Figure 4B:
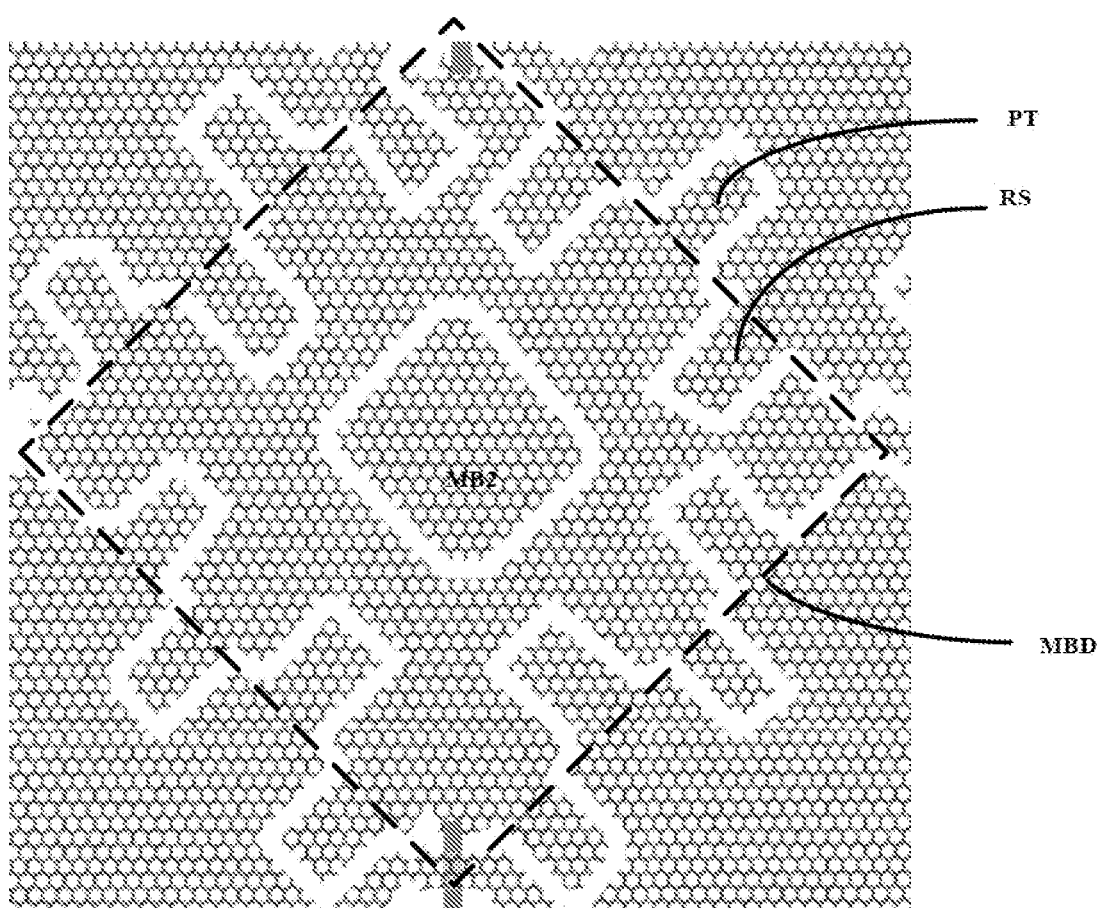
FIG. 4B is a zoom-in view of a respective one of a plurality of second mesh block in some embodiments according to the present disclosure.

FIG. 4A is a zoom-in view of a respective one of a plurality of first mesh block in some embodiments according to the present disclosure. FIG. 4B is a zoom-in view of a respective one of a plurality of second mesh block in some embodiments according to the present disclosure. Referring to FIG. 4A, a respective first mesh block of the plurality of first mesh electrodes MB1 has a pseudo-square shape with protrusions PT protruding away from a main body MBD and recesses RS recessing into the main body MBD. Referring to FIG. 4B, a respective second mesh block of the plurality of second mesh electrodes MB2 has a pseudo-square shape with protrusions PT protruding away from a main body MBD and recesses RS recessing into the main body MBD. Optionally, each side of the respective first mesh block of the plurality of first mesh electrodes MB1 has a length in a range of 1.5 mm to 2.5 mm. Optionally, each side of the respective first mesh block of the plurality of first mesh electrodes MB1 has a length of approximately 2.0 mm. Optionally, each side of the respective second mesh blocks of the plurality of second mesh electrodes MB2 has a length in a range of 1.5 mm to 2.5 mm. Optionally, each side of the respective second mesh blocks of the plurality of second mesh electrodes MB2 has a length of approximately 2.0 mm.

Figure 5:
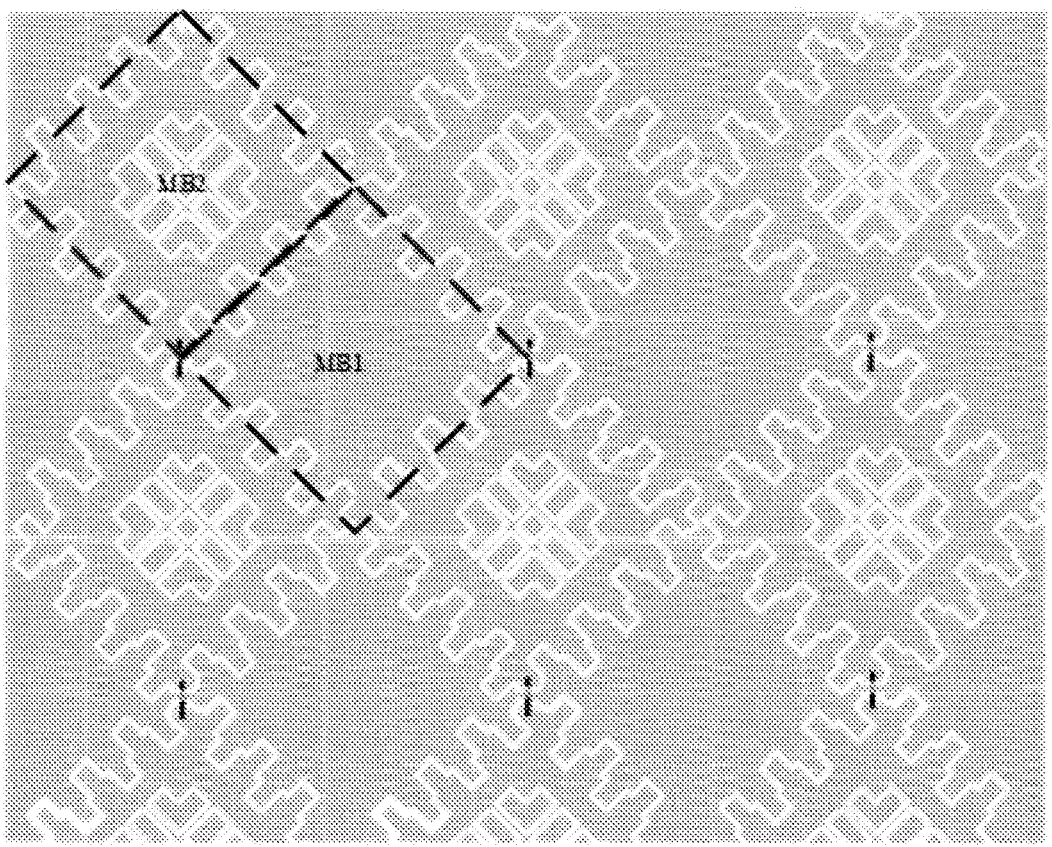
FIG. 5 is a schematic diagram illustrating the structure of a touch control structure in some embodiments according to the present disclosure.

FIG. 5 is a schematic diagram illustrating the structure of a touch control structure in some embodiments according to the present disclosure. Referring to FIG. 5, a respective first mesh block of the plurality of first mesh electrodes MB1 has a pseudo-square shape, and a respective second mesh block of the plurality of second mesh electrodes MB2 has a pseudo-square shape. In the touch control structure of FIG. 5, each side of the respective first mesh block of the plurality of first mesh electrodes MB1 has a length of approximately 4.0 mm, and each side of the respective second mesh blocks of the plurality of second mesh electrodes MB2 has a length of approximately 4.0 mm. An occupied area of the mesh block in the touch control structure of FIG. 5 is approximately four times of an occupied area of the mesh block in the touch control structure of FIG. 1, FIG. 4A, and FIG. 4B. In the touch control structure of FIG. 5, in a 4.0 mm×4.0 mm area occupied by a respective mesh block, there is no cross-over of first mesh electrode and second mesh electrode, mutual capacitance in an internal portion of the 4.0 mm×4.0 mm area occupied by a respective mesh block is small. Whereas, around the vertex of the 4.0 mm×4.0 mm area occupied by a respective mesh block, mutual capacitance is relatively large due to its proximity to a position of the cross-over of first mesh electrode and second mesh electrode. Thus, values of mutual capacitance varies greatly across a line between two opposite vertexes of the 4.0 mm×4.0 mm area occupied by a respective mesh block, resulting in poor linearity. For example, an active stylus pen typically has a relatively small contact area (typically a contact point). When the active stylus pen is used across the internal portion of the 4.0 mm×4.0 mm area occupied by a respective mesh block, it is rather difficult to achieve an accurate touch control due to the relatively small mutual capacitance in this portion.

As compared to the touch control structure of FIG. 5, the touch control structure of FIG. 1 in some embodiments has four mesh electrodes in a 4.0 mm×4.0 mm area. For example, referring to FIG. 1, the 4.0 mm×4.0 mm area is occupied by R1MB1, R1MB2, R2MB1, and R2MB2. In the touch control structure of FIG. 1, cross-over of first mesh electrode and second mesh electrode is present not only at the vertex of the 4.0 mm×4.0 mm area, but also in the internal portion of the 4.0 mm×4.0 mm area. Accordingly, as compared to the touch control structure of FIG. 5, an evenly distributed mutual capacitance throughout the 4.0 mm×4.0 mm area can be achieved in the touch control structure of FIG. 1. When the active stylus pen is used across the internal portion of the 4.0 mm×4.0 mm area, a more accurate touch control performance can be achieved due to highly enhanced mutual capacitance uniformity throughout the 4.0 mm×4.0 mm area. Table 1 summarizes touch control performance respectively of an embodiment according to the touch control structure of FIG. 5 and an embodiment according to the touch control structure of FIG. 1.

TABLE 1

Touch control performance respectively of the touch control structure
of FIG. 5 and the touch control structure of FIG. 1.

|  | An embodiment according to touch control structure of FIG. 5 | An embodiment according to touch control structure of FIG. 1 |
| --- | --- | --- |
| Cm (Mutual capacitance without touch) (pF) | 1.218 | 1.178 |
| Cm' (Mutual capacitance with touch) (pF) | 1.161 | 1.086 |
| ΔCm (Difference between mutual capacitance without touch and mutual capacitance with touch) (pF) | 0.054 | 0.092 |
| ΔCm/Cm | 5.03% | 7.8% |
| Resistance of a respective first mesh electrode (Ω) | 29.67 | 12.79 |
| Resistance of a respective second mesh electrode (Ω) | 28.54 | 11.43 |

As shown in Table 1, as compared to the embodiment according to touch control structure of FIG. 5, the embodiment according to touch control structure of FIG. 1 achieves a significantly greater value of ΔCm (over 70% increase), a highly accurate touch control performance can be achieved. Moreover, mesh electrodes of the embodiment according to touch control structure of FIG. 1 has a much lower resistance as compared to mesh electrodes of the embodiment according to touch control structure of FIG. 5, resulting in a significantly lower RC loading value. The lower RC loading value significantly improves the performance of touch scanning electrode driving frequency and signal-to-noise ratio.

Figure 6A:
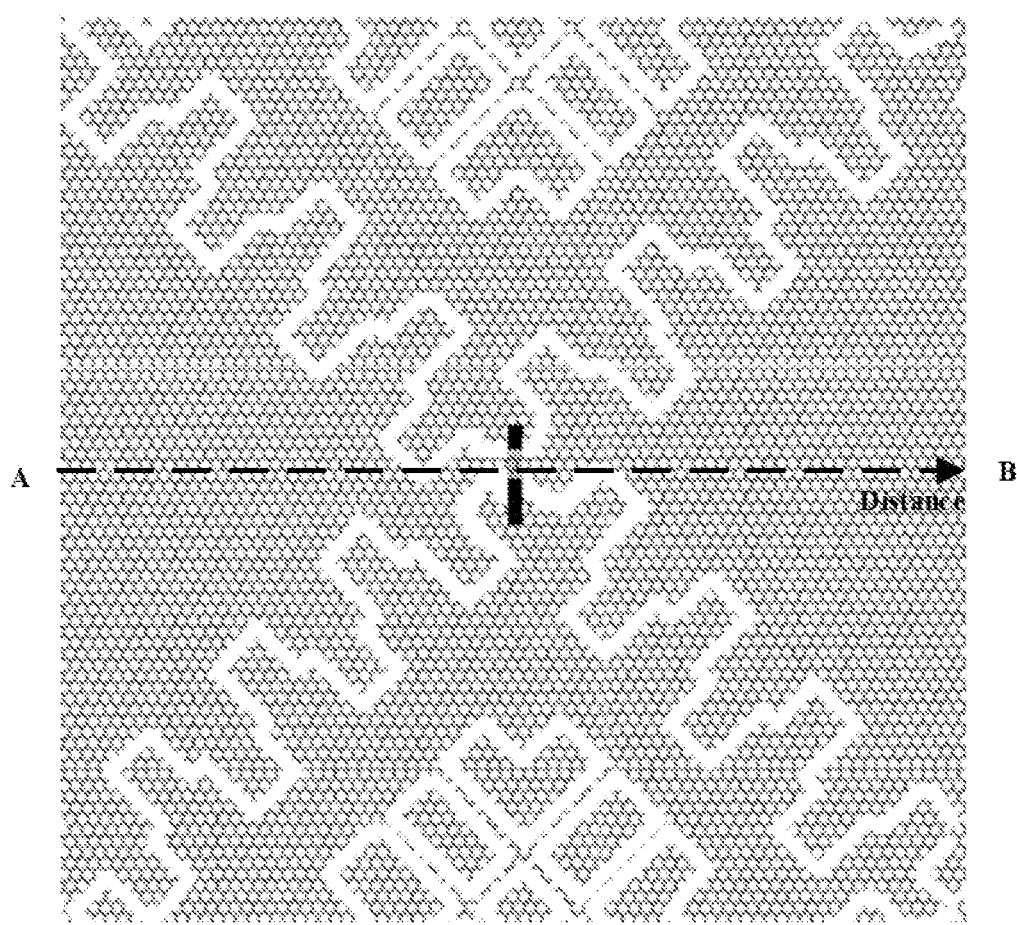
FIG. 6A is a zoom-in view of a region in a touch control structure of FIG. 5.
Figure 6B:
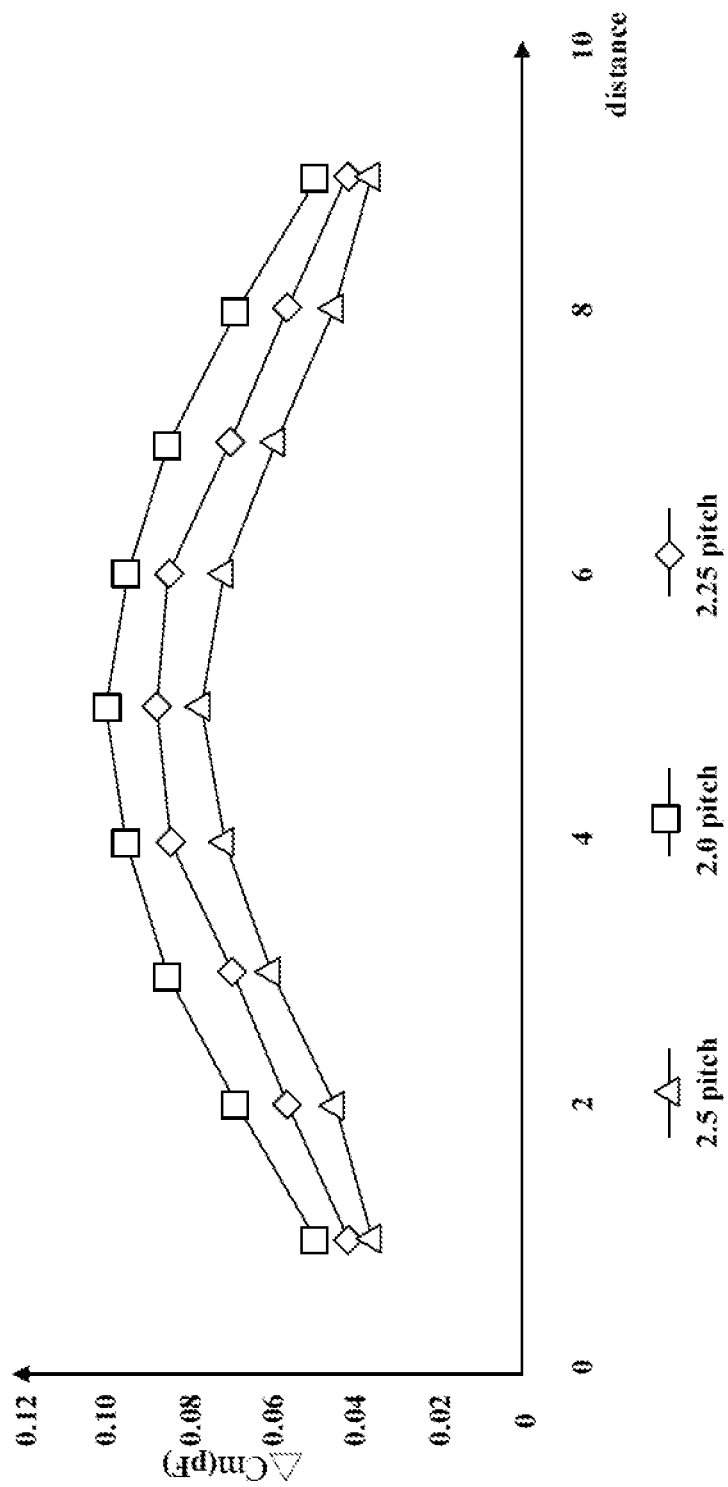
FIG. 6B illustrates values of ΔCm across the region of FIG. 6A when an active stylus pen is used.
Figure 7A:
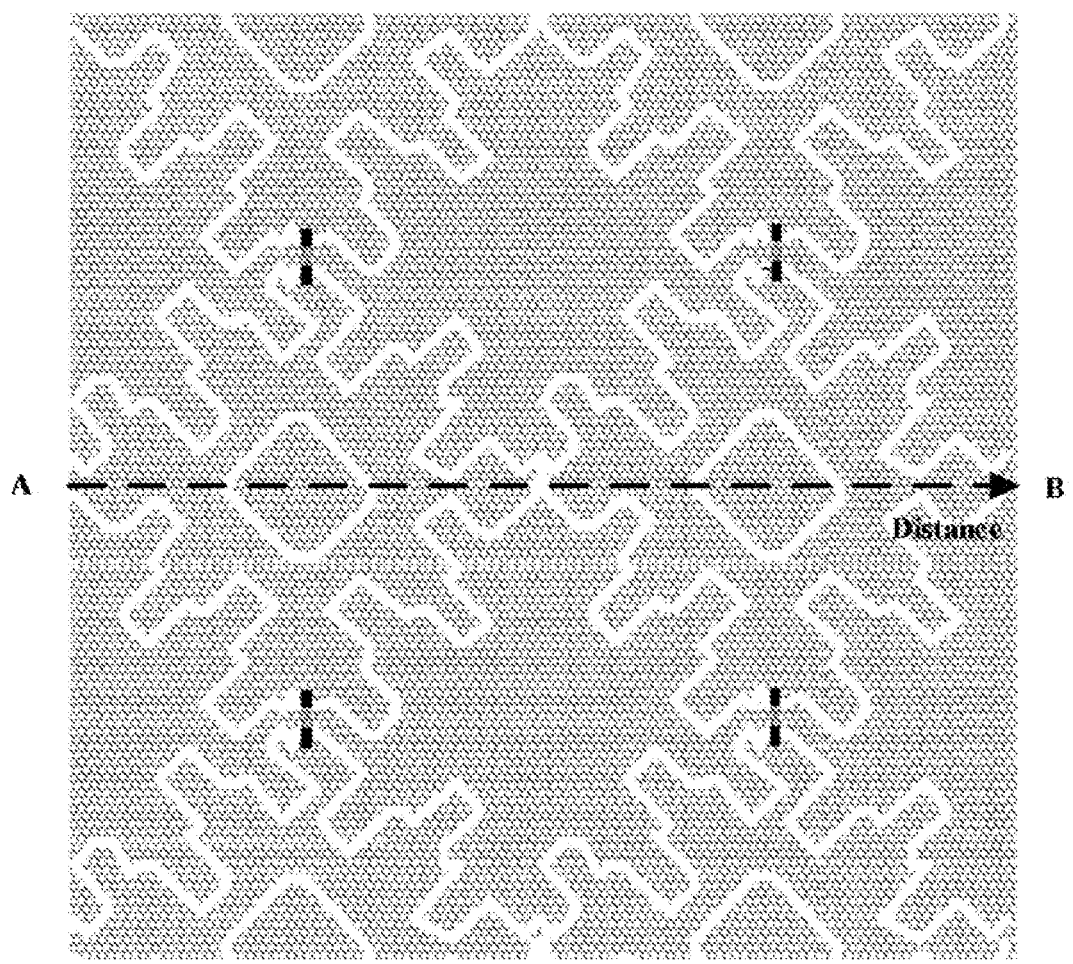
FIG. 7A is a zoom-in view of a region in a touch control structure of FIG. 1.
Figure 7B:
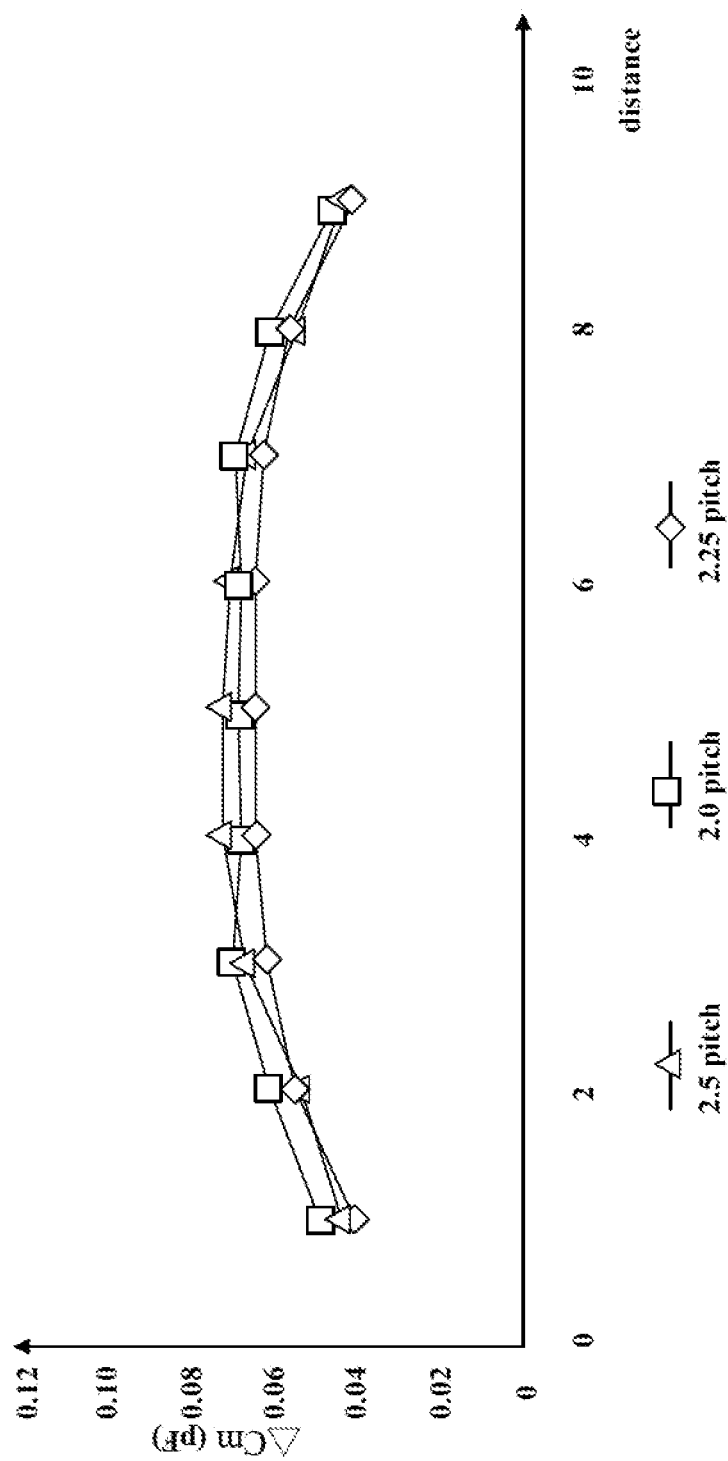
FIG. 7B illustrates values of ΔCm across the region of FIG. 7A when an active stylus pen is used.

FIG. 6A is a zoom-in view of a region in a touch control structure of FIG. 5. FIG. 6B illustrates values of ΔCm across the region of FIG. 6A when an active stylus pen is used. As shown in FIG. 6A and FIG. 6B, when the active stylus pen crosses over the region from point A to point B, the touch signal has a relatively large variability. FIG. 7A is a zoom-in view of a region in a touch control structure of FIG. 1. FIG. 7B illustrates values of ΔCm across the region of FIG. 7A when an active stylus pen is used. As shown in FIG. 7A and FIG. 7B, when the active stylus pen crosses over the region from point A to point B, the touch signal has a relatively small variability, and much enhanced uniformity. Three active stylus pens having different contact areas (2.5 pitch, 2.0 pitch, and 2.25 pitch) were used. As shown in FIG. 6B and FIG. 7B, the embodiment according to the touch control structure of FIG. 1 achieves enhance touch performance regardless the contact area of the active stylus pen.

Figure 8A:
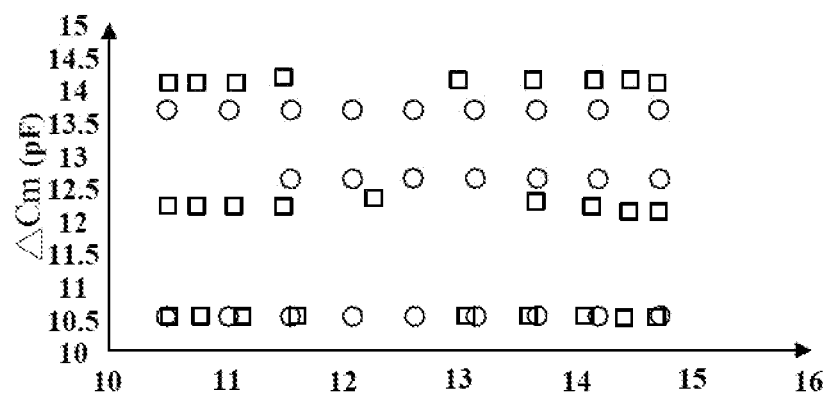
FIG. 8A illustrates touch accuracy of an embodiment according to the touch control structure of FIG. 5.
Figure 8B:
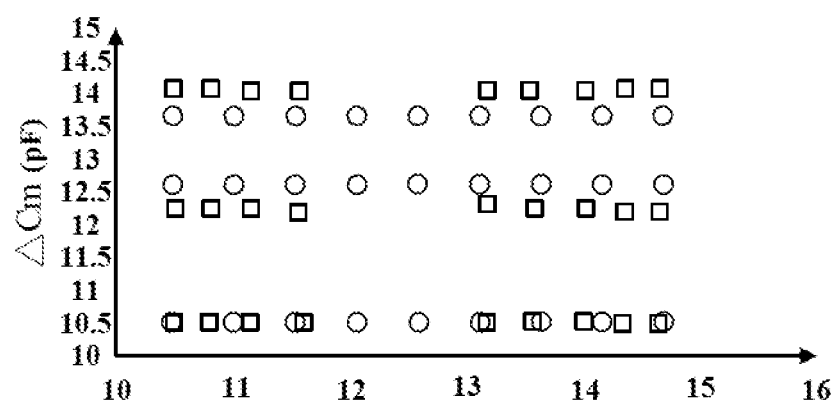
FIG. 8B illustrates touch accuracy of an embodiment according to the touch control structure of FIG. 1.

FIG. 8A illustrates touch accuracy of an embodiment according to the touch control structure of FIG. 5. FIG. 8B illustrates touch accuracy of an embodiment according to the touch control structure of FIG. 1. The values depicted in circles are calculated touch position, whereas the values depicted in squares are actual detected touch positions. Comparing FIG. 8A and FIG. 8B, the embodiment according to the touch control structure of FIG. 1 achieves much enhanced accuracy in touch detection as compared to the embodiment according to the touch control structure of FIG. 5.

Figure 9:
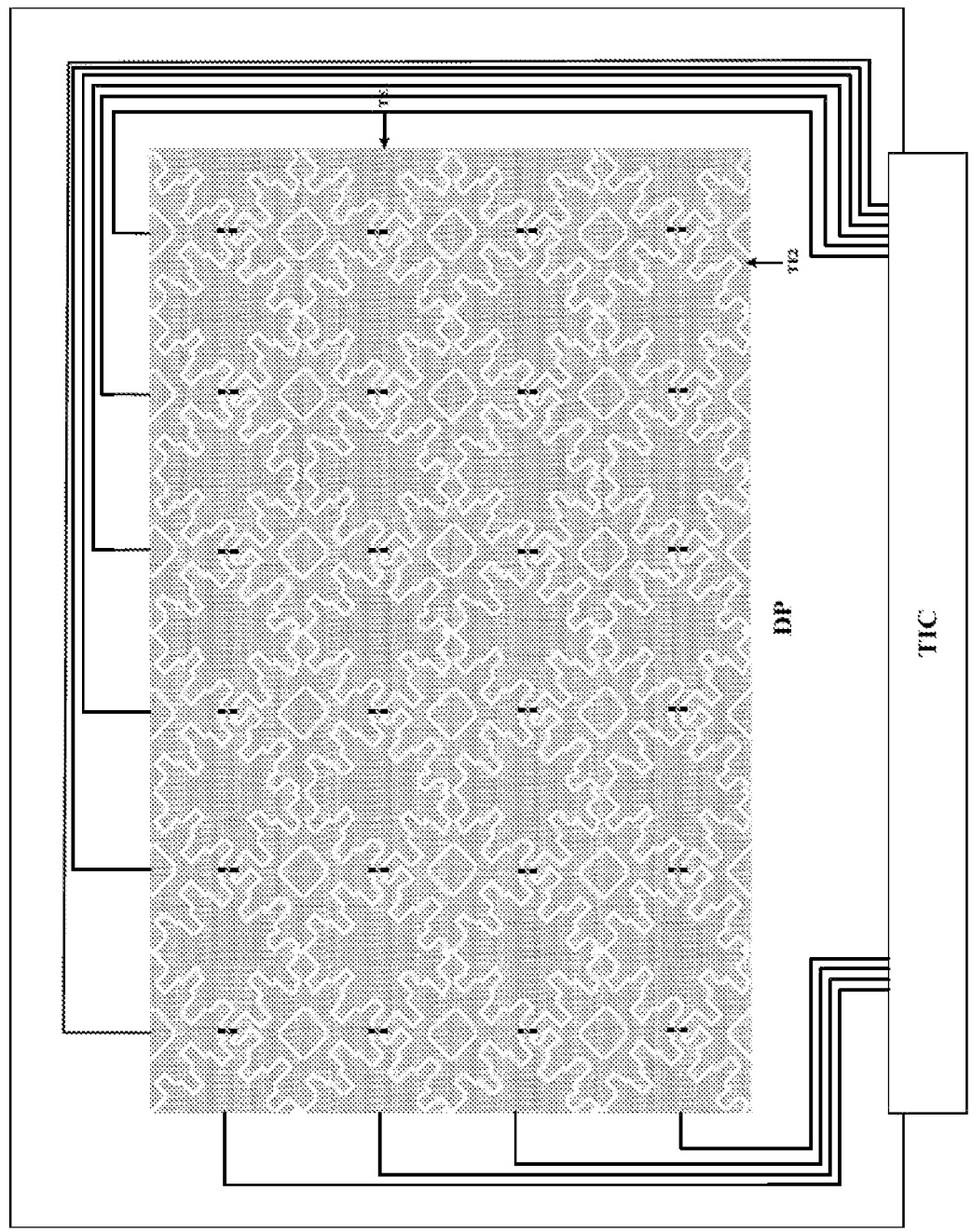
FIG. 9 is a plan view of a display apparatus in some embodiments according to the present disclosure.

In another aspect, the present disclosure provides a display apparatus. In some embodiments, the display apparatus includes a display panel, a touch control structure on the display panel, and a touch control integrated circuit connect to the touch control structure. In some embodiments, the display panel includes a plurality of display elements and a plurality of thin film transistors for driving the plurality of display elements. Optionally, the display elements includes a plurality of light emitting diodes, for example, in an organic light emitting diode display panel. Optionally, the display elements include a liquid crystal layer in a plurality of subpixels, for example, in a liquid crystal display panel. FIG. 9 is a plan view of a display apparatus in some embodiments according to the present disclosure. Referring to FIG. 9, the display apparatus in some embodiments includes the touch control structure described herein or fabricated by a method described herein, a display panel DP, and a touch control integrated circuit TIC connect to the touch control structure. Examples of appropriate display apparatuses include, but are not limited to, an electronic paper, a mobile phone, a tablet computer, a television, a monitor, a notebook computer, a digital album, a GPS, etc. Optionally, the display apparatus is an organic light emitting diode display apparatus. Optionally, the display apparatus is a liquid crystal display apparatus.

Figure 10:
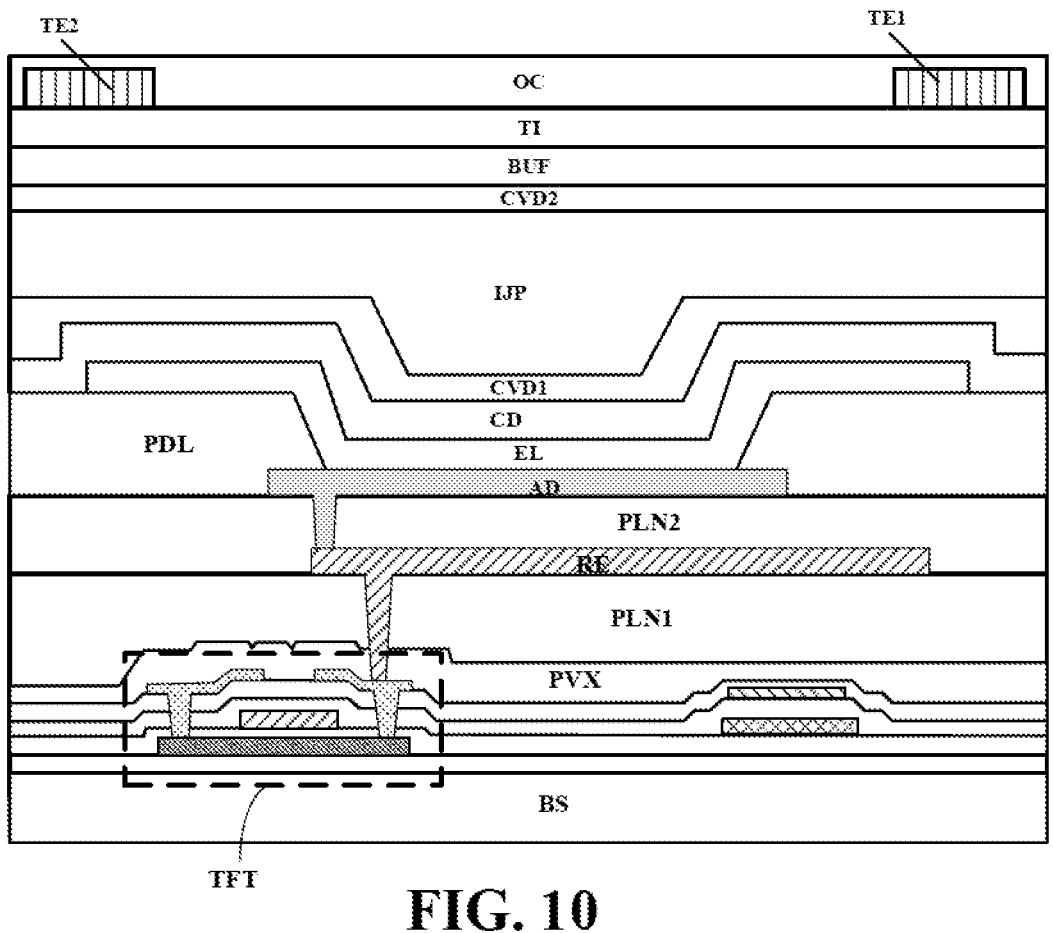
FIG. 10 is a cross sectional view of a display panel in some embodiments according to the present disclosure.

FIG. 10 is a cross sectional view of a display panel in some embodiments according to the present disclosure. Referring to FIG. 10, in the display region, the display panel includes a base substrate BS, a plurality of thin film transistors TFT on the base substrate BS, a passivation layer PVX on a side of the plurality of thin film transistors TFT away from the base substrate BS, a first planarization layer PLN1 on side of the passivation layer PVX away from the base substrate BS, a relay electrode RE on side of the first planarization layer PLN1 away from the passivation layer PVX, a second planarization layer PLN2 on a side of the relay electrode RE away from the first planarization layer PLN1, a pixel definition layer PDL on a side of the second planarization layer PLN2 away from the first planarization layer PLN1 and defining subpixel apertures, an anode layer AD on a side of the second planarization layer PLN2 away from the first planarization layer PLN1, a light emitting layer EL on a side of the anode layer AD away from the second planarization layer PLN2, a cathode layer CD on a side of the light emitting layer EL away from the anode layer AD, a first inorganic encapsulating layer CVD1 on a side of the cathode layer CD away from light emitting layer EL, an organic encapsulating layer IJP on a side of the first inorganic encapsulating layer CVD1 away from the cathode layer CD, a second inorganic encapsulating layer CVD2 on a side of the organic encapsulating layer IJP away from the first inorganic encapsulating layer CVD1, a buffer layer BUF on a side of the second inorganic encapsulating layer CVD2 away from the organic encapsulating layer IJP, a touch insulating layer TI on a side of the buffer layer BUF away from the second inorganic encapsulating layer CVD2, mesh electrodes (e.g., the plurality of first mesh electrodes TE1 and the plurality of second mesh electrodes TE2 as shown in FIG. 1) on a side of the touch insulating layer TI away from the buffer layer BUF, and an overcoat layer OC on a side of the mesh electrodes away from the touch insulating layer TI.

Figure 11:
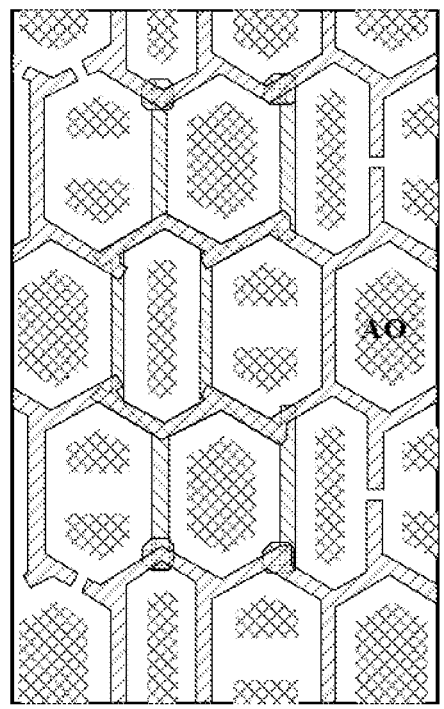
FIG. 11 is a zoom-in view of a region surrounding a respective conductive bridge in a display apparatus in some embodiments according to the present disclosure.

FIG. 11 is a zoom-in view of a region surrounding a respective conductive bridge in a display apparatus in some embodiments according to the present disclosure. Referring to FIG. 11, FIG. 3A to FIG. 3C, FIG. 1, FIG. 2, and FIG. 10, a respective one of the plurality of second mesh electrodes TE2 includes a plurality of second mesh blocks MB2 and a plurality of conductive bridges CB in a respective column, the plurality of second mesh blocks MB2 are consecutively electrically connected respectively through the plurality of conductive bridges CB. The plurality of first mesh blocks MB1 and the plurality of second mesh blocks MB2 are on a side of the touch insulating layer TI away from the plurality of conductive bridges CB. A respective conductive bridge of the plurality of conductive bridges CB are respectively electrically connected to two adjacent second mesh blocks respectively through vias extending through the touch insulating layer TI.

In some embodiments, orthographic projections of mesh lines of the touch control structure in the display region on a base substrate BS are non-overlapping with orthographic projections of the plurality of anodes AO on the base substrate BS. An orthographic projection of a mesh of the touch control structure in the display region on the base substrate BS surrounds an orthographic projection of one or two anode of the plurality of anodes AO on the base substrate BS.

In some embodiments, the respective conductive bridge RCB in some embodiments includes a first truncated hexagonal mesh hint1, a hexagonal mesh hin, and a second truncated hexagonal mesh hmt2 consecutively connected to each other. The respective conductive bridge RCB is in the first metal layer (ML1 as depicted in FIG. 2). The first truncated hexagonal mesh hmt1 is electrically connected to a first adjacent second mesh block AMB2-1, two mesh lines of the first truncated hexagonal mesh hmt1 are respectively connected to one or more mesh lines of the first adjacent second mesh block AMB2-1 respectively through a first via v1 and a second via v2. The second truncated hexagonal mesh hmt2 is electrically connected to a second adjacent second mesh block AMB2-2, two mesh lines of the second truncated hexagonal mesh hmt2 are respectively connected to one or more mesh lines of the second adjacent second mesh block AMB2-2 respectively through a third via v3 and a fourth via v4.

In some embodiments, an orthographic projection of the hexagonal mesh hm on a base substrate BS surrounds an orthographic projection of an anode of the plurality of anodes AO on the base substrate BS. An orthographic projection of the first truncated hexagonal mesh hmt1 on the base substrate BS partially surrounds an orthographic projection of an anode of the plurality of anodes AO on the base substrate BS. An orthographic projection of the second truncated hexagonal mesh hmt2 on the base substrate BS partially surrounds an orthographic projection of an anode of the plurality of anodes AO on the base substrate BS.

In another aspect, the present disclosure provides a method of fabricating a touch control structure. In some embodiments, the method includes forming a plurality of first mesh electrodes respectively in a plurality of rows and forming a plurality of second mesh electrodes respectively in a plurality of columns. Optionally, forming a respective one of the plurality of first mesh electrodes includes forming a plurality of first mesh blocks consecutively connected in a respective row. Optionally, forming the plurality of first mesh blocks includes forming a first respective first mesh block in a space foamed by a first set of four adjacent second mesh blocks, the first respective first mesh block spaced apart and insulated from the four adjacent second mesh blocks in the first set, the four adjacent second mesh blocks in the first set being electrically connected to each other.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A touch control structure, comprising a plurality of first mesh electrodes respectively in a plurality of rows and a plurality of second mesh electrodes respectively in a plurality of columns;
   wherein a respective one of the plurality of first mesh electrodes comprises a plurality of first mesh blocks consecutively connected in a respective row; and
   the plurality of first mesh blocks comprise a first respective first mesh block in a space formed by a first set of four adjacent second mesh blocks, the first respective first mesh block being spaced apart and insulated from the four adjacent second mesh blocks in the first set, the four adjacent second mesh blocks in the first set being electrically connected to each other;
   wherein the plurality of first mesh blocks further comprise a second respective first mesh block in a space formed by a second set of four adjacent second mesh blocks, the second respective first mesh block spaced apart and insulated from the four adjacent second mesh blocks in the second set;

the first set and the second set have two second mesh blocks in common;

the first respective first mesh block and the second respective first mesh block are connected to each other and directly adjacent to each other along the respective row;

second mesh blocks in a same row in the second set are insulated from each other; and second mesh blocks in a same column in the second set are electrically connected to each other through a conductive bridge;

wherein the four adjacent second mesh blocks in the first set comprise a first respective second mesh block, a second respective second mesh block, a third respective second mesh block, and a fourth respective second mesh block;

the four adjacent second mesh blocks in the second set comprise the first respective second mesh block, the second respective second mesh block, a fifth respective second mesh block, and a sixth respective second mesh block;

the third respective second mesh block, the first respective second mesh block, and the fifth respective second mesh block are consecutively in a first row, the first respective second mesh block and the third respective second mesh block are connected to each other along the row direction, the first respective second mesh block and the fifth respective second mesh block are spaced apart and insulated from each other;

the fourth respective second mesh block, the second respective second mesh block, and the sixth respective second mesh block are consecutively in a second row, the second respective second mesh block and the fourth respective second mesh block are connected to each other along the row direction, the second respective second mesh block and the sixth respective second mesh block are spaced apart and insulated from each other;

the third respective second mesh block and the fourth respective second mesh block are in a first column and are electrically connected to each other through a first respective conductive bridge; and the first respective second mesh block and the second respective second mesh block are in a second column and are electrically connected to each other through a second respective conductive bridge;

the fifth respective second mesh block and the sixth respective second mesh block are in a third column and are electrically connected to each other through a third respective conductive bridge; and the first column, the second column, and the third column are consecutively arranged.

2. The touch control structure of claim 1, wherein the four adjacent second mesh blocks in the first set comprise a first respective second mesh block, a second respective second mesh block, a third respective second mesh block, and a fourth respective second mesh block;

the first respective second mesh block and the third respective second mesh block are in a first row and are connected to each other along a row direction;

the second respective second mesh block and the fourth respective second mesh block are in a second row and are connected to each other along the row direction;

the third respective second mesh block and the fourth respective second mesh block are in a first column and are electrically connected to each other through a first respective conductive bridge; and the first respective second mesh block and the second respective second mesh block are in a second column and are electrically connected to each other through a second respective conductive bridge.

3. The touch control structure of claim 1, wherein a respective one of the plurality of second mesh electrodes comprises a plurality of second mesh blocks consecutively electrically connected in a respective column;

the plurality of columns comprise a first column, a second column, and a third column;

the first column, the second column, and the third column are sequentially three consecutive columns;

a second mesh block in the first column, a second mesh block in the second column, and a second mesh block in the third column are along a row direction; and the second mesh block in the second column is connected to the second mesh block in first column, and is spaced apart and insulated from the second mesh block in the third column.

4. The touch control structure of claim 3, wherein the plurality of columns further comprise a fourth column and a fifth column;

the fifth column, the first column, the second column, the third column, and the fourth column are sequentially five consecutive columns;

the second mesh block in the third column is connected to a second mesh block in the fourth column;

the second mesh block in the first column is spaced apart and insulated from a second mesh block in the fifth column; and the second mesh block in the fifth column, the second mesh block in the first column, the second mesh block in the second column, the second mesh block in the third column, and the second mesh block in the fourth column are along the row direction.

5. The touch control structure of claim 1, wherein the plurality of second mesh electrodes comprise a plurality of groups;

a respective group of the plurality of groups comprises two second mesh electrodes respectively in two adjacent columns;

second mesh blocks respectively in the two adjacent columns and in a same row are connected to each other; and adjacent second mesh blocks respectively in different groups and in a same row are spaced apart and insulated from each other.

6. The touch control structure of claim 5, wherein, in a space between the two adjacent columns of the two second mesh electrodes in a same group of the plurality of groups, first mesh blocks respectively from the plurality of rows of first mesh electrodes form an intra-group column of first mesh blocks, first mesh blocks in the intra-group column are insulated from each other.

7. The touch control structure of claim 5, wherein, in a space between two adjacent groups of the plurality of groups, first mesh blocks respectively from the plurality of rows of first mesh electrodes form an inter-group column of first mesh blocks, first mesh blocks in the inter-group column are insulated from each other.

8. The touch control structure of claim 1, wherein a respective one of the plurality of second mesh electrodes comprises a plurality of second mesh blocks and a plurality of conductive bridges in a respective column, the plurality of second mesh blocks being consecutively electrically connected respectively through the plurality of conductive bridges;
the touch control structure further comprises a touch insulating layer;
the plurality of first mesh blocks and the plurality of second mesh blocks are on a side of the touch insulating layer away from the plurality of conductive bridges; and
a respective conductive bridge of the plurality of conductive bridges are respectively electrically connected to two adjacent second mesh blocks respectively through vias extending through the touch insulating layer.

9. The touch control structure of claim 8, wherein the respective conductive bridge comprises a first truncated hexagonal mesh, a hexagonal mesh, and a second truncated hexagonal mesh consecutively connected to each other;
the first truncated hexagonal mesh is electrically connected to a first adjacent second mesh block, two mesh lines of the first truncated hexagonal mesh are respectively connected to one or more mesh lines of the first adjacent second mesh block respectively through a first via and a second via; and
the second truncated hexagonal mesh is electrically connected to a second adjacent second mesh block, two mesh lines of the second truncated hexagonal mesh are respectively connected to one or more mesh lines of the second adjacent second mesh block respectively through a third via and a fourth via.

10. The touch control structure of claim 9, wherein an orthographic projection on a base substrate of any mesh line of the respective conductive bridge along a direction from the first adjacent second mesh block to the second adjacent second mesh block is at least partially non-overlapping with orthographic projections of mesh lines of the plurality of first mesh electrodes on the base substrate; and
an orthographic projection on the base substrate of any mesh line of the respective conductive bridge along a direction other than the direction from the first adjacent second mesh block to the second adjacent second mesh block overlaps with an orthographic projection of a connecting mesh line of the plurality of first mesh electrodes on the base substrate.

11. The touch control structure of claim 10, wherein the connecting mesh line comprises a mesh line connecting two adjacent first mesh blocks of the plurality of first mesh blocks in the respective row.

12. The touch control structure of claim 11, wherein the two adjacent first mesh blocks of the plurality of first mesh blocks in the respective row are connected through a connecting structure consisting of one or more mesh arranged in a single row.

13. The touch control structure of claim 1, wherein a respective first mesh block of the plurality of first mesh electrodes has a pseudo-square shape with protrusions protruding away from a main body and recesses recessing into the main body;
each side of the respective first mesh block of the plurality of first mesh electrodes has a length in a range of 1.5 mm to 2.5 mm;
the respective second mesh blocks of the plurality of second mesh electrodes has a pseudo-square shape with protrusions protruding away from a main body and recesses recessing into the main body; and
each side of the respective second mesh blocks of the plurality of second mesh electrodes has a length in a range of 1.5 mm to 2.5 mm.

14. A display apparatus, comprising a display panel, a touch control structure on the display panel, and a plurality of touch control integrated circuits connect to the touch control structure;
wherein the touch control structure comprises a plurality of first mesh electrodes respectively in a plurality of rows and a plurality of second mesh electrodes respectively in a plurality of columns;
wherein a respective one of the plurality of first mesh electrodes comprises a plurality of first mesh blocks consecutively connected in a respective row; and
the plurality of first mesh blocks comprise a first respective first mesh block in a space formed by a first set of four adjacent second mesh blocks, the first respective first mesh block spaced apart and insulated from the four adjacent second mesh blocks in the first set, the four adjacent second mesh blocks in the first set being electrically connected to each other;
wherein the display apparatus further comprises:
an anode layer comprising a plurality of anodes respectively in a plurality of subpixels;
a light emitting layer on the anode layer;
a cathode layer a side of the light emitting layer away from the anode layer;
an encapsulating layer on a side of the cathode layer away from the light emitting layer, the encapsulating layer encapsulating a plurality of display elements in a display region of the display panel; and
a touch insulating layer on a side of the encapsulating layer away from the cathode layer;
wherein a respective one of the plurality of second mesh electrodes comprises a plurality of second mesh blocks and a plurality of conductive bridges in a respective column, the plurality of second mesh blocks being consecutively electrically connected respectively through the plurality of conductive bridges;
the plurality of first mesh blocks and the plurality of second mesh blocks are on a side of the touch insulating layer away from the plurality of conductive bridges; and
a respective conductive bridge of the plurality of conductive bridges are respectively electrically connected to two adjacent second mesh blocks respectively through vias extending through the touch insulating layer.

15. The display apparatus of claim 14, wherein orthographic projections of mesh lines of the touch control structure in the display region on a base substrate are non-overlapping with orthographic projections of the plurality of anodes on the base substrate; and
an orthographic projection of a mesh of the touch control structure in the display region on the base substrate surrounds an orthographic projection of one or two anode on the base substrate.

16. The display apparatus of claim 14, wherein the respective conductive bridge comprises a first truncated hexagonal mesh, a hexagonal mesh, and a second truncated hexagonal mesh consecutively connected to each other;
the first truncated hexagonal mesh is electrically connected to a first adjacent second mesh block, two mesh lines of the first truncated hexagonal mesh are respectively connected to one or more mesh lines of the first adjacent second mesh block respectively through a first via and a second via; and
the second truncated hexagonal mesh is electrically connected to a second adjacent second mesh block, two mesh lines of the second truncated hexagonal mesh are respectively connected to one or more mesh lines of the second adjacent second mesh block respectively through a third via and a fourth via.

17. The display apparatus of claim 16, wherein an orthographic projection of the hexagonal mesh on a base substrate surrounds an orthographic projection of an anode on the base substrate;
an orthographic projection of the first truncated hexagonal mesh on the base substrate partially surrounds an orthographic projection of an anode on the base substrate; and
an orthographic projection of the second truncated hexagonal mesh on the base substrate partially surrounds an orthographic projection of an anode on the base substrate.

* * * * *